Sept. 20, 1971     W. R. GARRETT     3,606,392
VIBRATION DAMPENER
Filed April 14, 1969
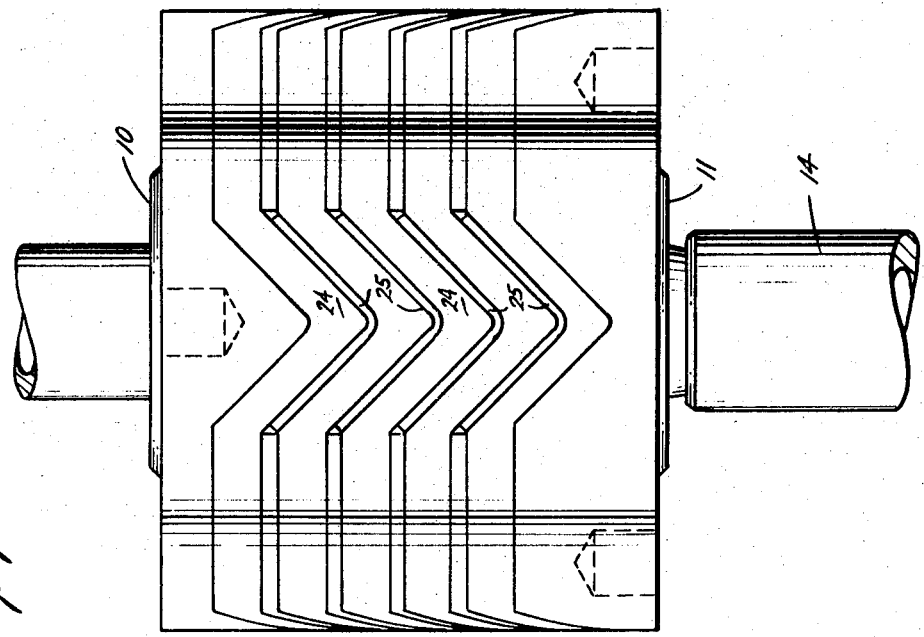
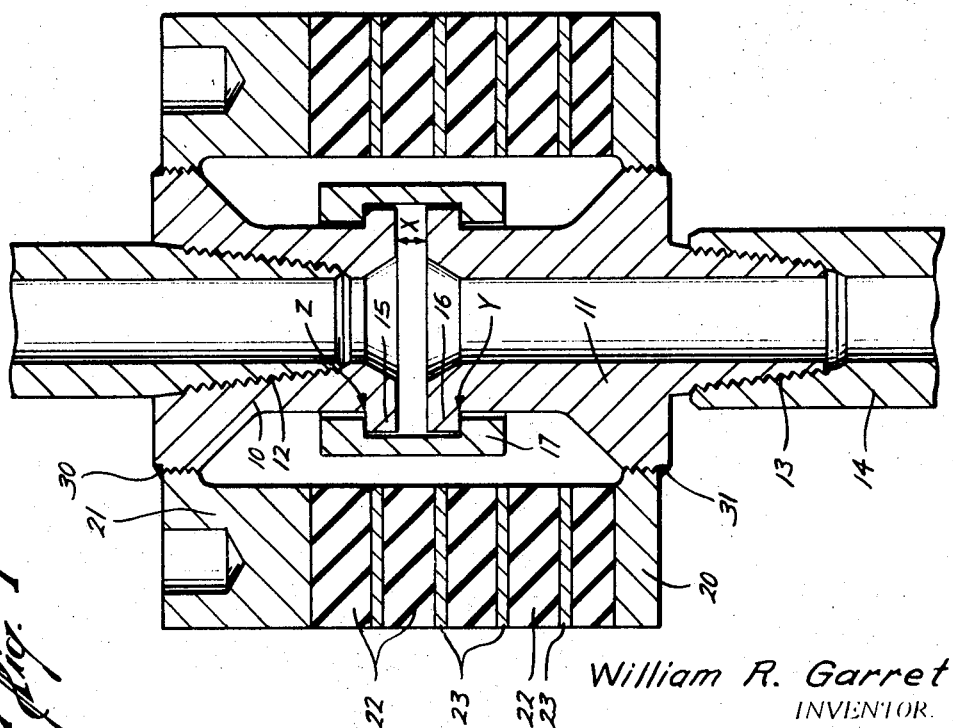
William R. Garrett
INVENTOR.
BY Murray Robinson
ATTORNEY

3,606,392
VIBRATION DAMPENER
William R. Garrett, Midland, Tex., assignor to Smith
Industries International, Inc., Midland, Tex.
Filed Apr. 14, 1969, Ser. No. 815,854
Int. Cl. F16l *11/12*
U.S. Cl. 285—49                                          7 Claims

ABSTRACT OF THE DISCLOSURE

A vibration dampener may be used between the drill steel and power swivel of a boring machine. An annular stack of alternating rubber and metal rings bonded together and vulcanized, and including offset portions, provide means to transmit fluid, torque, and compression.

A pair of tubes with a lost motion connection therebetween disposed inside the annular stack provides means to transmit tension.

BACKGROUND OF THE INVENTION

(a) Field of the invention

This invention pertains to fluid conducting, rotary drill, vibration dampeners.

(b) Discussion of the prior art

Vibration dampeners have heretofore been used in rotary drill strings used in deep well drilling, the vibration dampener being placed between the drill bit and the string of drill collars used to weight the bit. Hole diameter places a severe limitation on any such down the hole tool. It has not heretofore been customary to use a vibration dampener for shallow hole boring. In such shallow boring there is not enough length of string to weight the bit sufficiently; accordingly pull down means reacting against the weight of the drilling machine is used. Since most of the downward force on the bit is applied above the power swivel or other rotary drive means, a vibration dampener placed above ground between the power swivel and the upper end of the drill steel serves to provide sufficient shock load protection for most of the apparatus.

SUMMARY OF THE INVENTION

According to the invention a vibration dampener may include an annular stack of alternating elastomeric, e.g. rubber, and metal, e.g. steel, rings bonded and vulcanized together, each ring including an axially offset portion. Within the stack may be disposed a tubular means including two nipples connected end to end in lost motion relationship by a coupling. Each nipple is screwed into a metal flange forming a ring at one end of the annular stack until all the lost motion in the connection between the nipples is taken up. The nipples are then welded to the flanges. Threads at the free ends of the nipples provide means to connect to the drill steel and power swivel portions of the drill string. The stack provides annular resilient means to transmit torque, compression, fluid, and what little bending moment may be imposed on the vibration dampener. The tubular means including the lost motion connection provides means to transmit tension without transmitting compression. Compressional shock loads from the drill steel are thus insulated from the power swivel. Other features of the invention are set forth in the claims and may best be explained in the following description of a preferred embodiment of the invention.

BRIEF DESCRIPTION OF THE DRAWINGS

For a detailed description of a preferred eembodiment of the invention reference will now be made to the accompanying drawings but this is only exemplary of the invention which can be varied by one skilled in the art.

FIG. 1 is an axial section through a vibration dampener embodying the invention;

FIG. 2 is an elevation of the vibration dampener shown in FIG. 1.

DESCRIPTION OF PREFERRED EMBODIMENT

Referring to FIG. 1, there is shown a tool including two pipe nipples 10, 11, the upper nipple having an internally threaded box 12 for making connection with a power swivel, the lower nipple having an externally threaded pin 13 for making connection with drill steel 14. The adjacent ends of the nipples have flanges 15, 16 which are captured by a collar 17, there normally being space X between the flanges so they can move toward each other when the tool is loaded in compression. When the nipples move closer together, a space opens up at Y (or at Z if the tool is turned upside down from the position shown). The nipples and collar thus provide a telescopic joint with travel limit, i.e. a lost motion connection, to take any axial tension placed on the tool while allowing for contraction for the tool under compressive loading.

The other ends of the nipples opposite from flanges 15, 16 are provided with large flanges or rings 20, 21 screwed and welded onto the nipples. The nipples are enlarged where they make threaded connection with the rings so that the inner diameter of the rings can be larger than the outer diameter of the collar 17.

Between the rings 20, 21 is a stack of alternate rubber and steel rings or washers 22, 23. As shown in the elevational view, the washers each have offset portions 24, 25 therein, there being four such offsets in each washer.

The washers 23, 24 and rings 20, 21 are bonded together with cement, placed in a mold and vulcanized. The rubber has a durometer hardness of 45 to 75.

The collar 17 is split diametrically and placed around flanges 15, 16, and then the collar parts are welded together.

The central tube comprising the nipples and collar is then screwed into the outer tube formed of the rings and washers. The nipples are screwed into the rings far enough to take up the slack between the nipples and collar. Then the nipples are welded to the rings at 30, 31. Ring 20 is provided with wrench sockets 30 to facilitate makeup of the vibration dampener with drill steel 14.

In use, the outer tube takes the compressive loading, transmits torque, and provides a seal around the inner tube which takes axial tension. The outer tube transmits torque both by loading the rubber washers in shear and, through the offsets, in compression and tension. Note that the rubber elements of the tool do not transmit load between the inner tube and the outer tube. Torque and compressive loads go solely through the outer tube (not counting the extremities of the nipples 10, 11 which lie between the rings 20, 21 of the outer tube) and the power swivel and drill steel.

The vibration dampener not only reduces the amplitude of the repetitive small movements or vibrations of the drill steel before transmitting them to the rest of the drilling apparatus but also reduces the amplitude of the larger intermittent movements of the drill steel before they are transmitted to the rest of the drilling apparatus and in this capacity might be termed a shock absorber.

The vibration dampener is especially designed for use in connection with power swivel drive means and air as the drilling fluid but can be used with other rotary drive means and other drilling fluids, e.g. mud, water or oil.

I claim:
1. A vibration dampener comprising
   tubular means including a first nipple, a second nipple, and a lost motion connection between adjacent ends of the nipples, said lost motion connection providing means to transmit tension axially of said tubular means between said nipples, and annular resilient means disposed coaxially around said tubular means and connected thereto on opposite sides of said lost motion connection, said annular resilient means including alternate elastomeric and metal rings connected together to transmit torque about the axis of the stack and compression axially of the stack, said annular resilient means providing means resiliently to transmit compression axially of said tubular means between said nipples and resiliently to transmit torque about the axis of said tubular means between said nipples and providing seal means about said lost motion connection to transmit fluid between said nipples.

2. Combination of claim 1 wherein metal and elastomer rings of said stack each include an axially extending offset.

3. Combination of claim 1 wherein said lost motion connection is fully extended when said stack in unstressed axially.

4. Combination of claim 3 wherein said nipples are externally threaded and screwed into internal threads in metal rings forming opposite ends of said stack and said nipples are also welded to the last said rings.

5. Combination of claim 4 wherein said lost motion connection comprises flanges on adjacent ends of said nipples captured by a split coupling disposed therearound and welded together.

6. Combination of claim 5 wherein one of said nipples is provided with a threaded socket and the other with a threaded pin at the ends thereof opposite from said lost motion connection.

7. Vibration dampener comprising tubular means to transmit tension including an upper nipple and a lower nipple, means at the upper end of the upper nipple for making fluid tight connection with a power swivel, means at the lower end of tthe lower nipple for making fluid tight connection with a drill steel, said nipples being disposed coaxially and connected by means limiting axial separation of the upper end of the upper nipple from the lower end of the lower nipple but allowing relative axial approach of said ends from the position of maximum separation set by said connection means, and annular resilient means disposed about said nipples connected to said upper nipple and said lower nipple to transmit torque and axial compression therebetween, said annular resilient means including metal-elastomer sandwich means to transmit said torque and compression while reducing the amplitude of vibrations and intermittent larger amplitude motions transmitted from the lower nipple to the upper nipple, said metal-elastomer sandwich means to transmit torque including portions placing the elastomer in compression during transmission of torque, said vibration dampener including means to prevent the loss from the dampener of fluid flowing through said tubular means.

References Cited

UNITED STATES PATENTS

| 2,098,703 | 11/1937 | Geyer | 64—11 |
| 2,620,165 | 12/1952 | Crickmer | 64—11 |
| 2,880,599 | 4/1959 | Hlinsky | 64—11X |
| 2,570,577 | 10/1951 | Manton | 175—321X |

FOREIGN PATENTS

| 89,500 | 9/1922 | Austria | 64—11 |

DAVE W. AROLA, Primary Examiner

U.S. Cl. X.R.

64—11, 13, 23; 175—321; 285—114, 330